United States Patent
Bajpai

(10) Patent No.: US 11,180,155 B2
(45) Date of Patent: *Nov. 23, 2021

(54) VEHICULAR CONTROL SYSTEM RESPONSIVE TO YAW RATE ESTIMATION

(71) Applicant: MAGNA ELECTRONICS INC., Auburn Hills, MI (US)

(72) Inventor: Devendra Bajpai, Bloomfield Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 135 days.

This patent is subject to a terminal disclaimer.

(21) Appl. No.: 16/564,354

(22) Filed: Sep. 9, 2019

(65) Prior Publication Data

US 2020/0001884 A1 Jan. 2, 2020

Related U.S. Application Data

(63) Continuation of application No. 15/707,026, filed on Sep. 18, 2017, now Pat. No. 10,407,080, which is a continuation of application No. 15/051,825, filed on Feb. 24, 2016, now Pat. No. 9,764,744.

(60) Provisional application No. 62/120,574, filed on Feb. 25, 2015.

(51) Int. Cl.
  *B60W 40/114* (2012.01)

(52) U.S. Cl.
  CPC ..... *B60W 40/114* (2013.01); *B60W 2520/125* (2013.01); *B60W 2520/28* (2013.01); *B60W 2540/18* (2013.01)

(58) Field of Classification Search
  CPC ............... B60W 40/114; B60W 40/10; B60W 2520/125; B60W 2520/28; B60W 2540/18
  See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |

(Continued)

*Primary Examiner* — Aaron L Troost
(74) *Attorney, Agent, or Firm* — Honigman LLP

(57) ABSTRACT

A vehicular control system includes a camera, a yaw rate sensor, wheel sensors, an accelerometer and a steering sensor. A control includes a processor that estimates the actual yaw rate of the vehicle based on (a) a first yaw rate derived from yaw rate data provided by the yaw rate sensor, and (b) at least one selected from the group consisting of (i) a second yaw rate derived from wheel sensor data provided by the wheel sensors, (ii) a third yaw rate derived from acceleration data provided by the accelerometer, and (iii) a fourth yaw rate derived from steering data provided by the steering sensor. The vehicular control system at least in part controls the vehicle based on (i) image data captured by the camera as the vehicle travels along a road and (ii) the estimated actual yaw rate of the vehicle.

42 Claims, 8 Drawing Sheets

(56) References Cited

U.S. PATENT DOCUMENTS

| | | |
|---|---|---|
| 5,765,116 A | 6/1998 | Wilson-Jones et al. |
| 5,765,118 A | 6/1998 | Fukatani |
| 5,781,437 A | 7/1998 | Wiemer et al. |
| 5,796,094 A | 8/1998 | Schofield et al. |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 6,097,024 A | 8/2000 | Stam et al. |
| 6,144,022 A | 11/2000 | Tenenbaum et al. |
| 6,175,300 B1 | 1/2001 | Kendrick |
| 6,178,034 B1 | 1/2001 | Allemand et al. |
| 6,198,409 B1 | 3/2001 | Schofield et al. |
| 6,223,114 B1 | 4/2001 | Boros et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |
| 6,370,329 B1 | 4/2002 | Teuchert |
| 6,392,315 B1 | 5/2002 | Jones et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,672,731 B2 | 1/2004 | Schnell et al. |
| 6,678,614 B2 | 1/2004 | McCarthy et al. |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,711,474 B1 | 3/2004 | Treyz et al. |
| 6,714,331 B2 | 3/2004 | Lewis et al. |
| 6,735,506 B2 | 5/2004 | Breed et al. |
| 6,744,353 B2 | 6/2004 | Sjonell |
| 6,762,867 B2 | 7/2004 | Lippert et al. |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,889,161 B2 | 5/2005 | Winner et al. |
| 6,909,753 B2 | 6/2005 | Meehan et al. |
| 6,975,775 B2 | 12/2005 | Rykowski et al. |
| 6,989,736 B2 | 1/2006 | Berberich et al. |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,167,796 B2 | 1/2007 | Taylor et al. |
| 7,195,381 B2 | 3/2007 | Lynam et al. |
| 7,202,776 B2 | 4/2007 | Breed |
| 7,227,611 B2 | 6/2007 | Hull et al. |
| 7,460,951 B2 | 12/2008 | Altan |
| 7,480,149 B2 | 1/2009 | DeWard et al. |
| 7,490,007 B2 | 2/2009 | Taylor et al. |
| 7,581,859 B2 | 9/2009 | Lynam |
| 7,592,928 B2 | 9/2009 | Chinomi et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,881,496 B2 | 2/2011 | Camilleri et al. |
| 8,027,029 B2 | 9/2011 | Lu et al. |
| 8,058,977 B2 | 11/2011 | Lynam |
| 8,340,866 B2 | 12/2012 | Hanzawa et al. |
| 8,694,224 B2 * | 4/2014 | Chundrlik, Jr. ......... H04N 7/183 701/84 |
| 9,764,744 B2 | 9/2017 | Bajpai |
| 10,407,080 B2 * | 9/2019 | Bajpai ................ B60W 40/114 |
| 2002/0015153 A1 | 2/2002 | Downs |
| 2002/0113873 A1 | 8/2002 | Williams |
| 2003/0137586 A1 | 7/2003 | Lewellen |
| 2003/0156015 A1 | 8/2003 | Winner et al. |
| 2003/0222982 A1 | 12/2003 | Hamdan et al. |
| 2004/0114381 A1 | 6/2004 | Salmeen et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0250501 A1 | 11/2006 | Wildmann et al. |
| 2006/0290479 A1 | 12/2006 | Akatsuka et al. |
| 2007/0104476 A1 | 5/2007 | Yasutomi et al. |
| 2008/0189013 A1 * | 8/2008 | Iwazaki ................ B60T 8/172 701/41 |
| 2009/0113509 A1 | 4/2009 | Tseng et al. |
| 2009/0177347 A1 | 7/2009 | Breuer et al. |
| 2009/0244361 A1 | 10/2009 | Gebauer et al. |
| 2010/0228437 A1 | 9/2010 | Hanzawa et al. |
| 2012/0245817 A1 | 9/2012 | Cooprider et al. |
| 2013/0124052 A1 | 5/2013 | Hahne |
| 2013/0231825 A1 * | 9/2013 | Chundrlik, Jr. ........... G01P 3/50 701/29.1 |
| 2014/0350834 A1 | 11/2014 | Turk |
| 2015/0291215 A1 | 10/2015 | Bajpai et al. |

\* cited by examiner

Yaw Rate Offset Estimation

FIG. 6 Variance of the signals.

FIG. 7 Offset Correction

Results – 2: Yaw Rate Estimation Output

VEHICULAR CONTROL SYSTEM RESPONSIVE TO YAW RATE ESTIMATION

CROSS REFERENCE TO RELATED APPLICATIONS

The present application is a continuation of U.S. patent application Ser. No. 15/707,026, filed Sep. 18, 2017, now U.S. Pat. No. 10,407,080, which is a continuation of U.S. patent application Ser. No. 15/051,825, filed Feb. 24, 2016, now U.S. Pat. No. 9,764,744, which claims the filing benefits of U.S. provisional application Ser. No. 62/120,574, filed Feb. 25, 2015, which is hereby incorporated herein by reference in its entirety.

FIELD OF THE INVENTION

The present invention relates generally to a yaw rate determination system for a vehicle.

BACKGROUND OF THE INVENTION

Sensing yaw rate is important to land-based vehicles, and specifically, to road-going vehicles. Vehicle systems, such as collision avoidance systems, collision mitigation systems and stability control systems, may require accurate values of yaw rate to correctly determine the projected path of vehicle travel. Yaw rate sensors are susceptible to error, and if the measured yaw rate has significant error, then these kinds of vehicle systems may perform poorly or even fail.

SUMMARY OF THE INVENTION

The present invention provides a yaw rate estimation system that is operable to compute or determine an estimated yaw rate using additional vehicle signals and vehicle kinematics to compute the estimated yaw rate (and the system does this without using a forward facing or viewing camera or imager). Because the forward viewing camera is a recipient of the estimated yaw rate, known forward viewing camera yaw rate methods are dependent on this estimation, and thus cannot be used for this estimation. The system of the present invention processes multiple yaw rates derived from different vehicle systems and a yaw rate sensor to determine an estimated yaw rate of the vehicle.

These and other objects, advantages, purposes and features of the present invention will become apparent upon review of the following specification in conjunction with the drawings.

DESCRIPTION OF THE PREFERRED EMBODIMENTS

Figure 1:
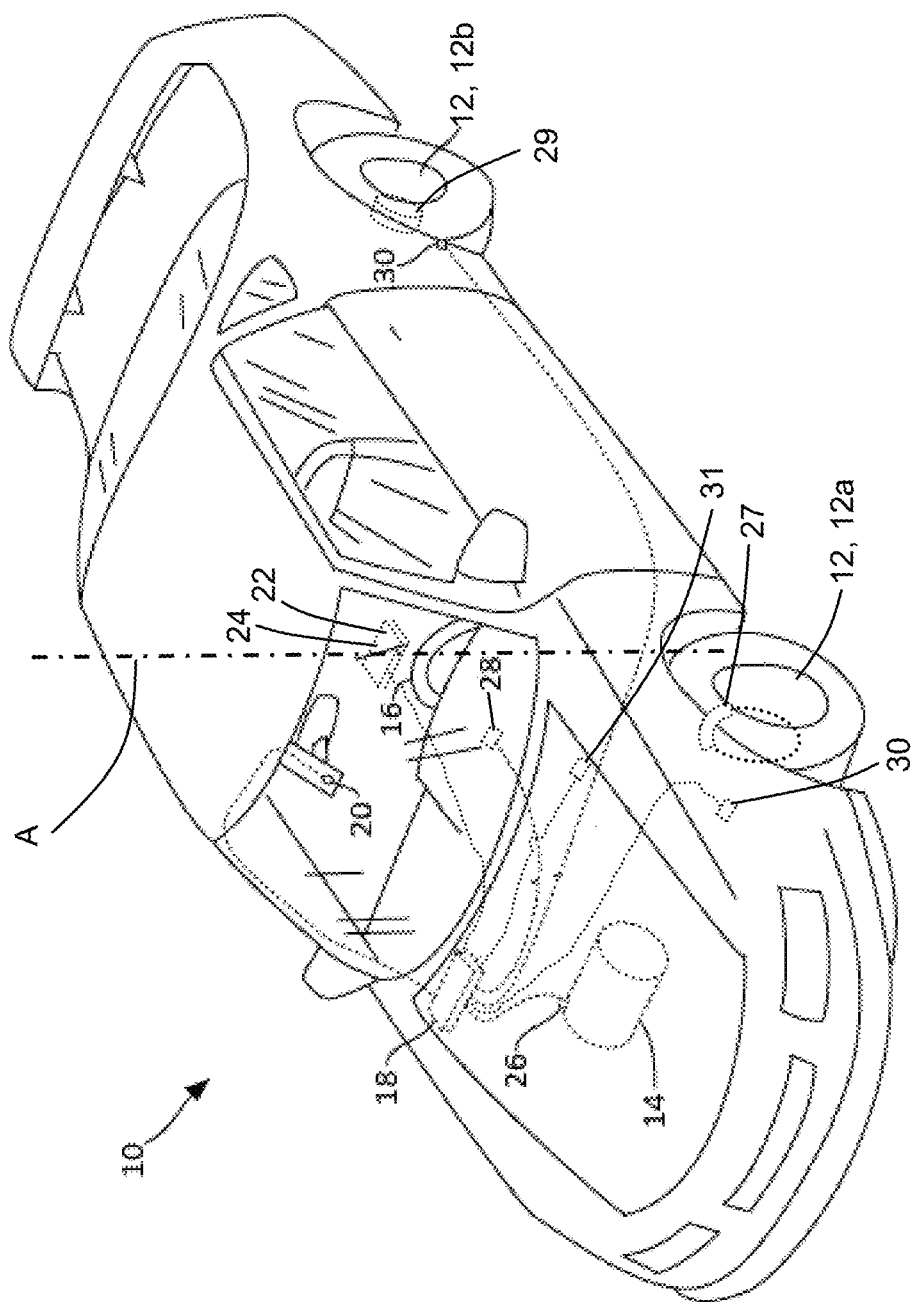
FIG. 1 is a plan view of a vehicle with a vision system that incorporates cameras in accordance with the present invention.

Referring now to the drawings and the illustrative embodiments depicted therein, FIG. 1 illustrates a vehicle 10 equipped with the system of the present invention. In this example, the vehicle 10 is a passenger car, but in other examples, the vehicle may be a truck, bus, van, motorcycle, or any other kind of vehicle. In the illustrated embodiment, the equipped vehicle 10 includes a body, a passenger area, wheels 12 (including front wheels 12a and rear wheels 12b), an internal combustion engine and/or an electric motor to drive the vehicle 10, a transmission 14 to convey power from the engine or motor to the wheels 12, a steering wheel 16 to turn the front wheels 12a, as well as other components for powering and controlling the vehicle 10. Clearly, the equipped vehicle may have other systems or components, such as, for example, steering of the rear wheels 12b or the like, without affecting the scope of the present invention.

As shown in FIG. 1, the vehicle 10 further includes a control system 18, a camera 20, a yaw rate sensor 22, a longitudinal accelerometer 24, a transmission sensor 26, a steering angle sensor 28, a speed sensor 30 and a brake sensor 31. The camera 20, yaw rate sensor 22, longitudinal accelerometer 24, transmission sensor 26, steering angle sensor 28, and speed sensor 30 are each connected to the control system 18 to provide sensed information to the control system 18. Such connections may be by way of conductive wires or wireless signals. A bus, such as a Controller-Area Network (CAN) bus or a Local Interconnect Network (LIN) bus or the like, may be used for communication between the sensors and the control system 18. The system may utilize aspects of the systems described in U.S. Pat. No. 8,694,224, which is hereby incorporated herein by reference in its entirety.

The yaw rate sensor 22 is operable to sense the left and right yaw rate of the vehicle 10 (in other words, to sense the positive and negative angular rotational velocity of the vehicle about a local vertical axis A of the vehicle). Output of the yaw rate sensor 22 to the control system 18 may comprise a voltage within a range of voltages, or a data message sent over a communications bus or network bus of the vehicle, such as a CAN bus or the like. The yaw rate sensor 22 may include any type of device, such as piezoelectric device, a micromechanical device, a microelectromechanical device, or similar. The longitudinal accelerometer 24 is operable to sense the longitudinal (forward or reverse) acceleration of the vehicle 10 and provide a signal indicative of a magnitude of such acceleration to the control system 18. The longitudinal accelerometer 24 may include any type of device, such as piezoelectric device, a micromechanical device, a microelectromechanical device, or similar. The longitudinal accelerometer 24 may be part of a multi-axis accelerometer.

The system of the present invention provides yaw rate estimation using vehicle signals and statistical analysis techniques. The system provides yaw rate offset correction and noise filtering, and provides robust yaw rate estimation using vehicle signals. The system of the present invention thus improves the resolution of the yaw rate signal and provides fault tolerant yaw rate signals with better quality. Because the signals from individual yaw rate sensors may have poor resolution and offsets, the resolutions and offsets may be out of tolerance for lane keeping features and forward viewing camera applications. The present invention uses multiple yaw rate signals to provide an enhanced estimate of the yaw rate.

The vehicle signals used may include:
Wheel speeds for all four wheels (Vfl, Vrl, Vfr, Vrr).
Wheel radius and wheel speeds for all four wheels.
Yaw Rate Raw from the Yaw Rate Sensor.
Yaw Rate Offset from the Yaw Rate Sensor.
Lateral Acceleration.
Yaw Rate Temperature from the Yaw Rate Sensor.
Steering wheel angle, steering wheel rate of change, steering ratio for the entire speed range.
Wheel angle.
Vehicle stationary, engine running flags.
Vehicle driving straight flags.
Vehicle velocity.

The yaw rates may be estimated from the following equations, where YawRate_1 is the yaw rate from the yaw rate sensor and YawRate_2 is the yaw rate derived from the wheel sensors (such as anti-lock braking system (ABS) wheel sensors) and YawRate_3 is the yaw rate derived from the lateral acceleration of the vehicle and YawRate_4 is derived from the steering wheel angle, wheel angle and the rate of change of steering wheel angle.

$$YawRate2 : y_{r2} = \frac{Vx}{R}$$

$$YawRate3 : y_{r3} = \frac{Vx^2}{R}$$

Computation of radius of curvature R:

$$\frac{1}{R} = \frac{2}{L} \left( \frac{\frac{V_{rl}}{V_{rr}} - 1}{\frac{V_{rl}}{V_{rr}} + 1} \right),$$

$$V_x = \frac{\omega_{rl} + \omega_{rr}}{2} r$$

where $V_{fl}, V_{fr}, \ldots, V_{rr}$ wheel velocity m/s for four wheels, and, $w_{fl}, w_{fr}, \ldots, w_{rr}$ wheel rotation.

$V_x$ = longitudinal velocity, $r$ = radius nominal rear wheel

The yaw rate data analysis provides a "vehicle state" that is a function of the yaw rate, the SWA, SWA Rate, the lateral acceleration and wheel velocity.

The system uses signal conditioning, with a sampling frequency of about 100 Hz and a desired cut off frequency of about 0.5 Hz to about 2 Hz or thereabouts. The system uses two filters:

The Long Time Period Filter (60-180) sec.=[0.0167-0.005] Hz
  i) Compute Offset At Standstill (Velocity=0);
  ii) Compute Offset when driving straight (Steering Angle~=0) (Steering Rate of Change~=0);
  iii) Compute Variance of noise;
  iv) Estimate the offset using a PID controller; and
  v) Define weights on the estimate from (i) and (ii).

The Short Time IIR filter is around 2.0 Hz.

The system calculates offset estimates using weights and statistics.

Figure 2:
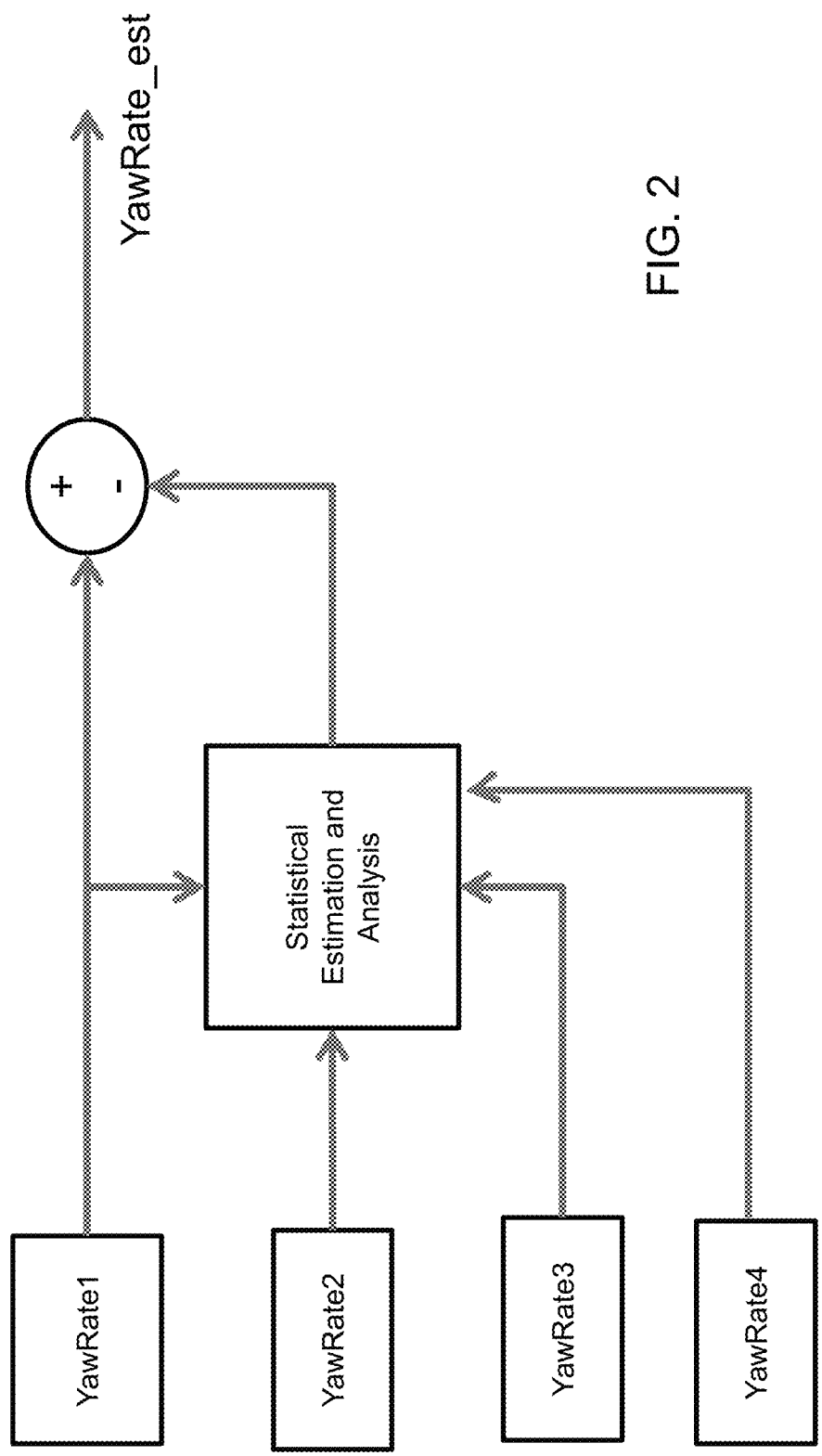
FIG. 2 is a block diagram showing processing of the yaw rate inputs to estimate the yaw rate in accordance with the present invention.
Figure 3:
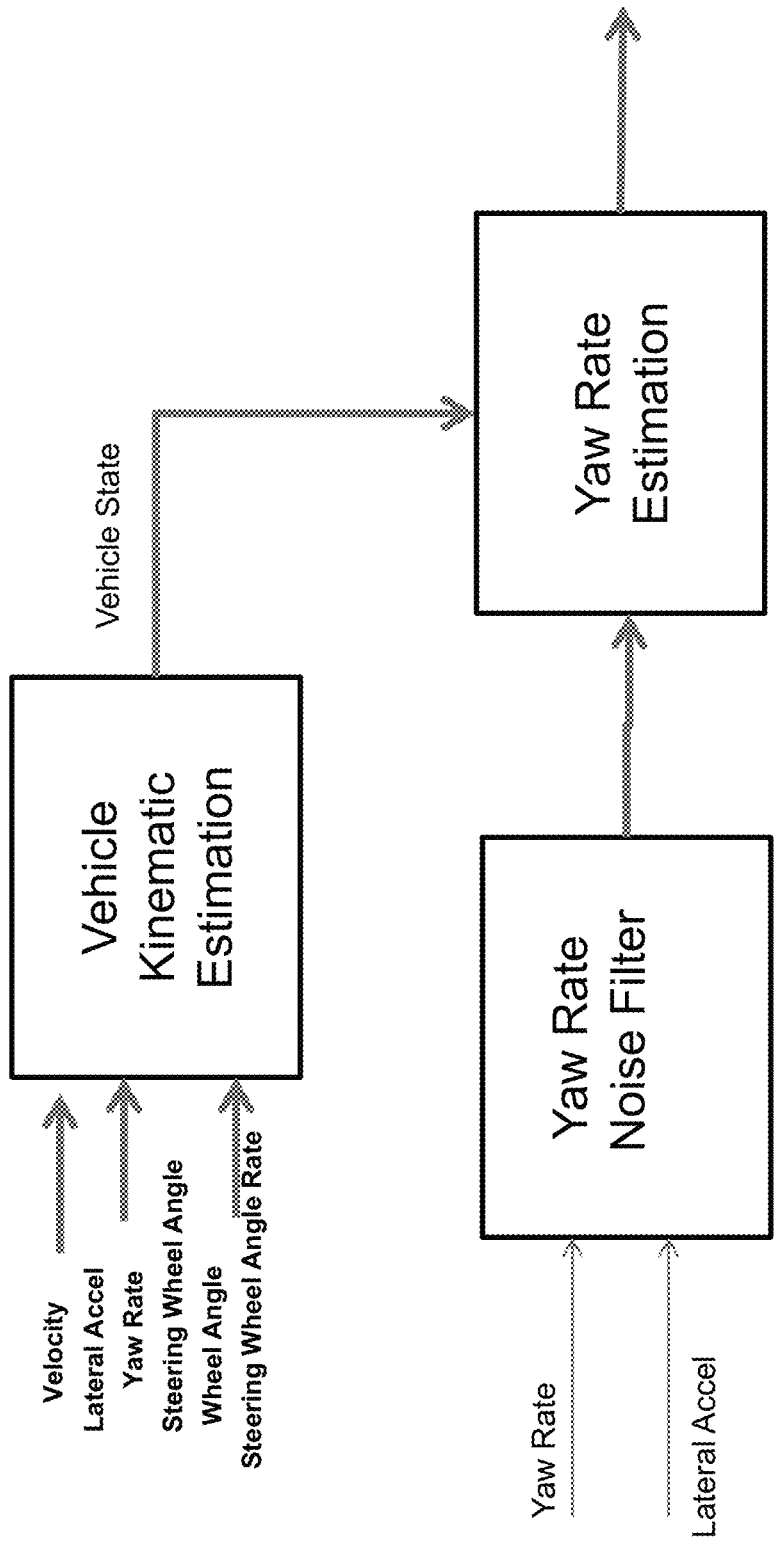
FIG. 3 is a block diagram showing the yaw rate estimation of the present invention, using vehicle kinematic estimations and yaw rate noise filters.
Figure 4:
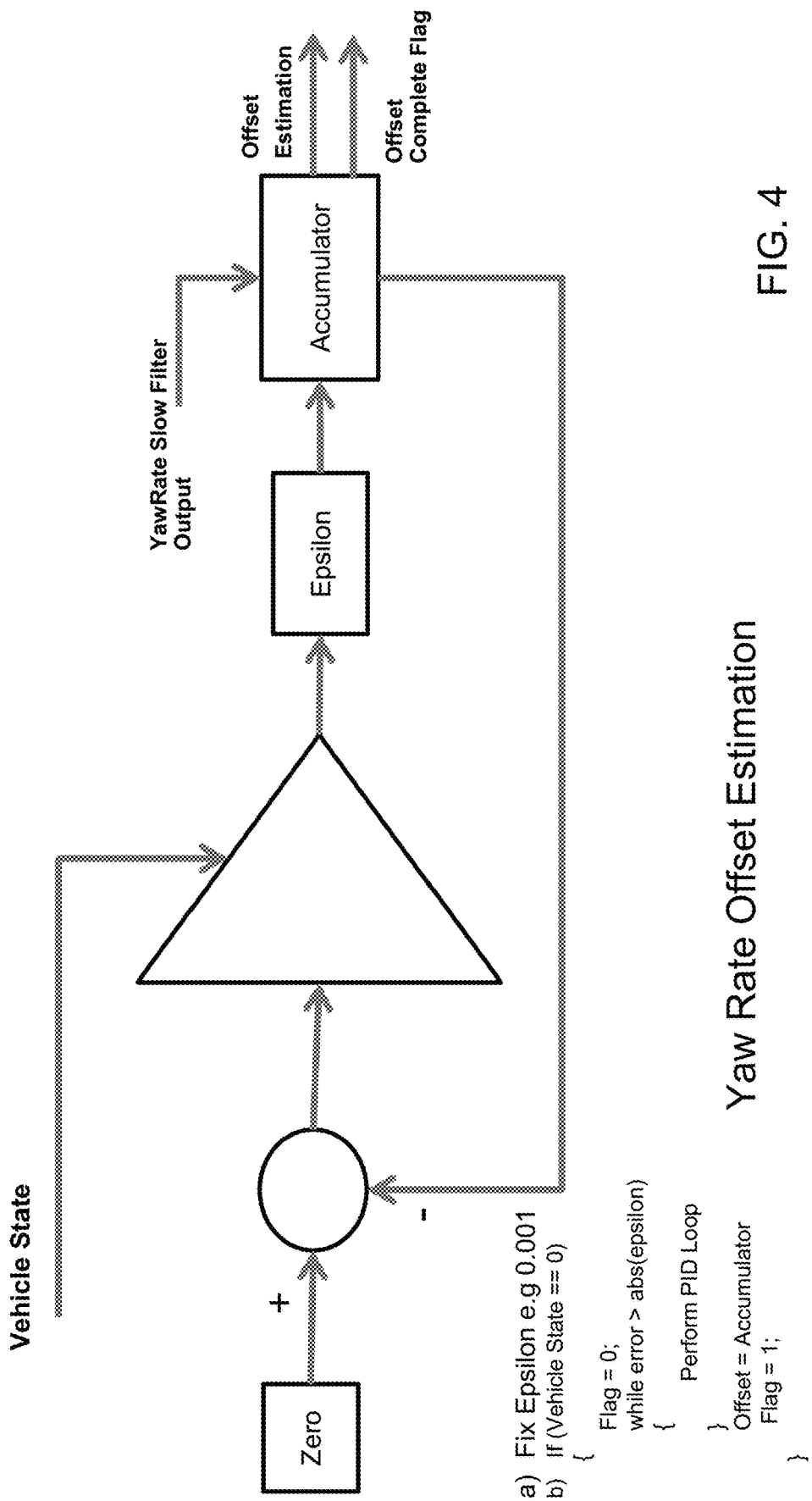
FIG. 4 is a block diagram of estimation of the yaw rate offset in accordance with the present invention.
Figure 5:
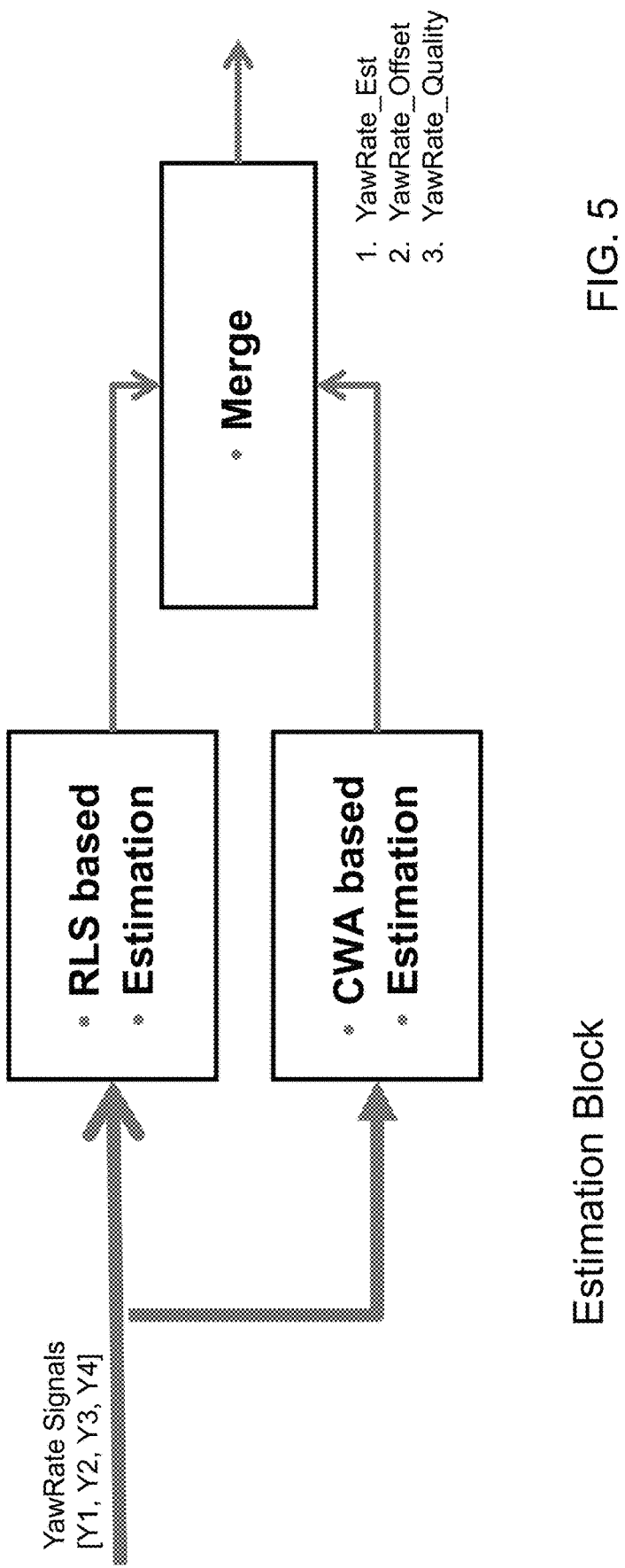
FIG. 5 is a block diagram of estimation of the yaw rate, the yaw rate offset and the yaw rate quality in accordance with the present invention.
Figure 6:
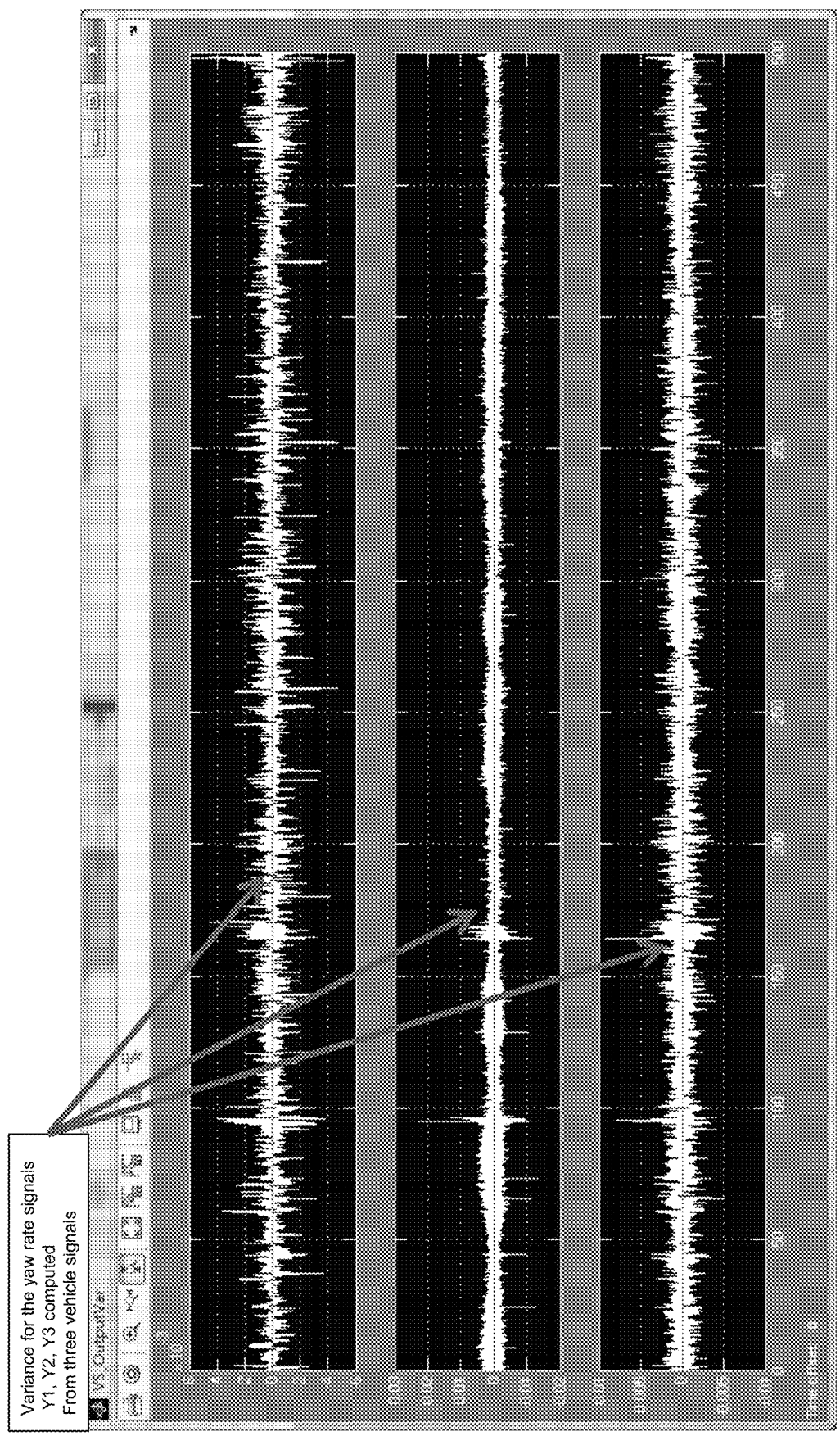
FIG. 6 shows graphs of the variance for the yaw rate signals derived from three vehicle signals.
Figure 7:
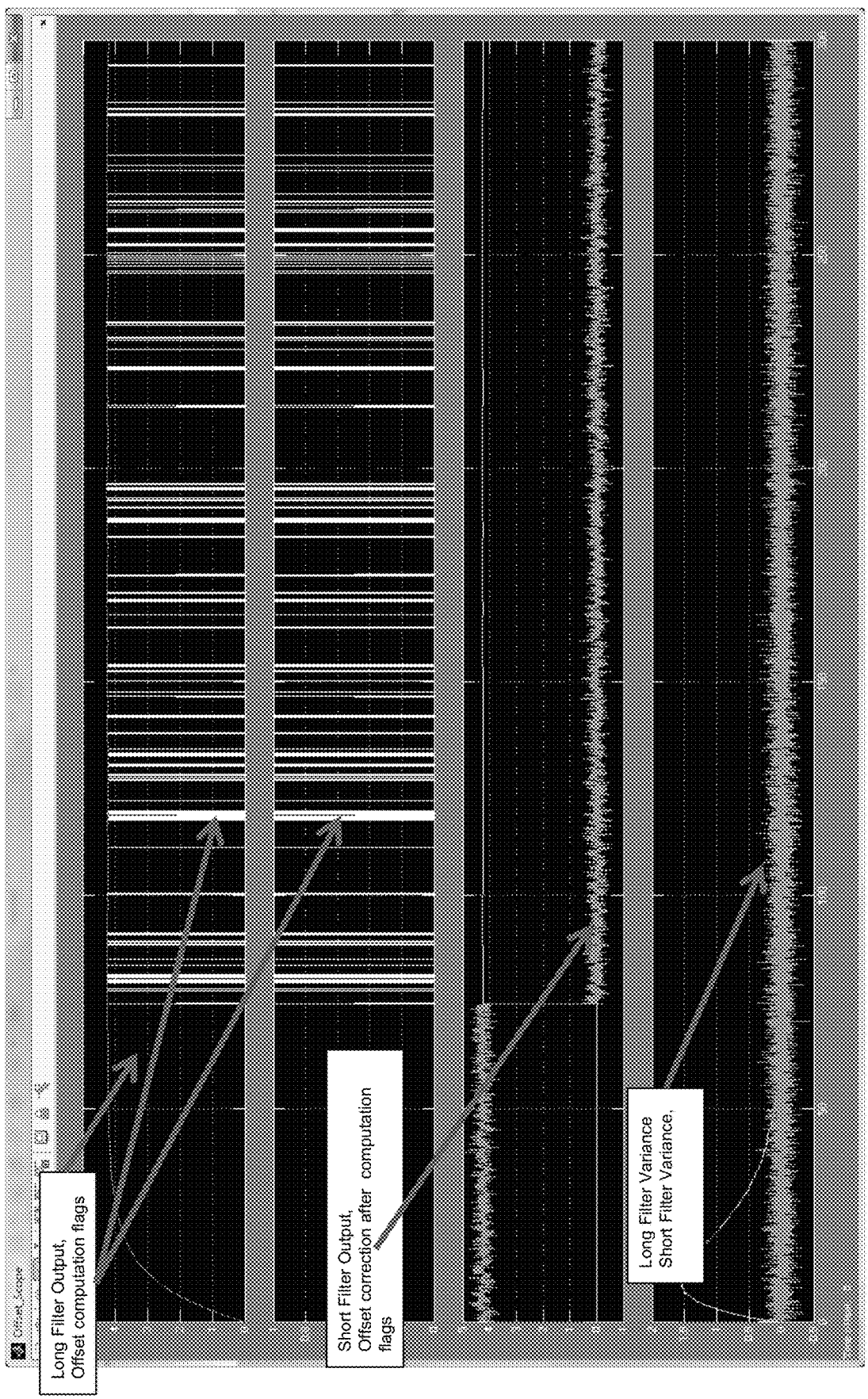
FIG. 7 shows graphs showing the offset correction.
Figure 8:
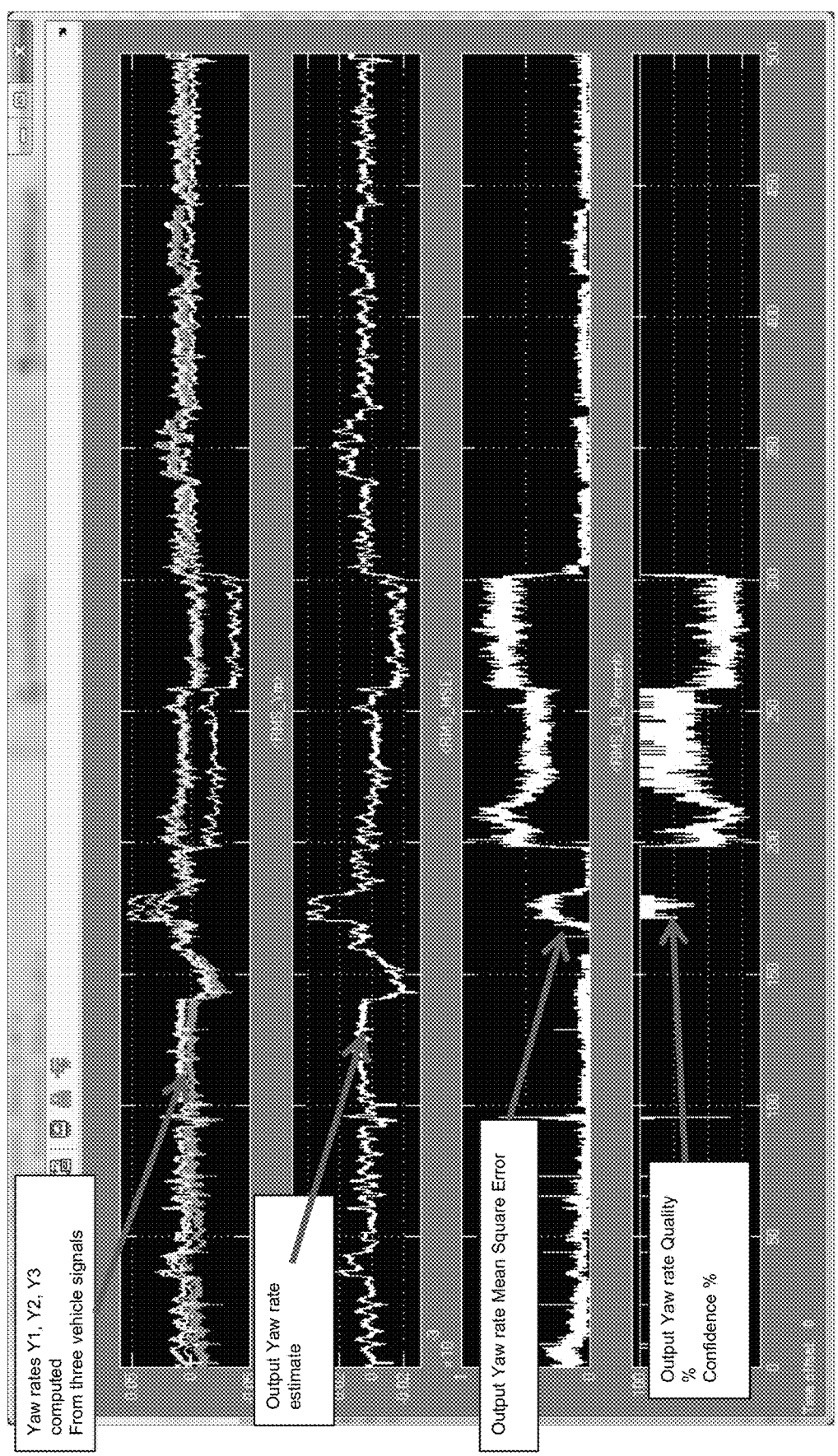
FIG. 8 shows graphs of the yaw rate estimation outputs.

As shown in FIG. 2, the system processes the four yaw rates via statistical estimation and analysis to determine the estimated yaw rate. The system may use adaptive offset estimation using Recursive Least Squares (RLS), confidence weighted average combined with Recursive Least Squares. FIGS. 3-5 show the yaw rate estimation process, the yaw rate offset estimation process and the estimation block in accordance with the present invention. FIGS. 6-8 are graphs showing the variance of the yaw rate signals (FIG. 6), the offset correction (FIG. 7) and the yaw rate estimation output (FIG. 8).

The system may provide additional outputs, such as, for example, a driving state: stable flag or output, a vehicle stationary engine running output, a vehicle driving straight and level output, a detection of sensor faults, such as a residual error (MSE) based confidence measure.

The system of the present invention may utilize aspects of the systems described in U.S. Pat. No. 8,694,224 and/or U.S. Publication Nos. US-2015-0291215 and/or US-2014-0350834, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, said vehicular control system comprising:
  a camera disposed at a vehicle equipped with said vehicular control system, wherein said camera is disposed at a windshield of the equipped vehicle and views through the windshield and forward of the equipped vehicle;
  a yaw rate sensor disposed at the equipped vehicle, said yaw rate sensor generating yaw rate data as the equipped vehicle travels along a road;
  wheel sensors disposed at wheels of the equipped vehicle, said wheel sensors generating wheel sensor data as the equipped vehicle travels along the road;
  an accelerometer disposed at the equipped vehicle, said accelerometer generating acceleration data as the equipped vehicle travels along the road;
  a steering sensor disposed at the equipped vehicle, said steering sensor generating steering data as the equipped vehicle travels along the road;
  a control disposed at the equipped vehicle, said control comprising a processor that estimates an actual yaw rate of the equipped vehicle based on (a) a first yaw rate calculated at said control by processing yaw rate data generated by said yaw rate sensor and (b) at least one selected from the group consisting of (i) a second yaw rate calculated at said control by processing wheel sensor data generated by said wheel sensors, (ii) a third yaw rate calculated at said control by processing acceleration data generated by said accelerometer and (iii) a fourth yaw rate calculated at said control by processing steering data generated by said steering sensor; and
  wherein said vehicular control system at least in part controls the equipped vehicle based on (i) image data captured by said camera as the equipped vehicle travels along the road and (ii) the estimated actual yaw rate of the equipped vehicle.

2. The vehicular control system of claim 1, wherein said vehicular control system comprises a collision avoidance system.

3. The vehicular control system of claim 1, wherein said vehicular control system comprises a collision mitigation system.

4. The vehicular control system of claim 1, wherein said vehicular control system comprises a lane keeping system.

5. The vehicular control system of claim 1, wherein said processor estimates the actual yaw rate of the equipped vehicle by averaging the first yaw rate and the at least one selected from the group consisting of the second yaw rate, the third yaw rate and the fourth yaw rate.

6. The vehicular control system of claim 1, wherein said processor estimates the actual yaw rate of the equipped vehicle by averaging the first yaw rate, the second yaw rate, the third yaw rate and the fourth yaw rate.

7. The vehicular control system of claim 1, wherein said processor estimates the actual yaw rate of the equipped vehicle using statistical analysis of the first, second, third and fourth yaw rates.

8. The vehicular control system of claim 7, wherein the statistical analysis uses Recursive Least Squares.

9. The vehicular control system of claim 8, wherein the statistical analysis uses Confidence Weighted Average combined with Recursive Least Squares.

10. The vehicular control system of claim 1, wherein said accelerometer generates longitudinal acceleration data representative of longitudinal acceleration of the equipped vehicle.

11. The vehicular control system of claim 1, wherein said accelerometer generates lateral acceleration data representative of lateral acceleration of the equipped vehicle.

12. The vehicular control system of claim 1, wherein said wheel sensors comprise wheel sensors of an anti-lock brake system of the equipped vehicle.

13. The vehicular control system of claim 1, wherein said yaw rate sensor is operable to sense a left yaw rate of the equipped vehicle and a right yaw rate of the equipped vehicle.

14. The vehicular control system of claim 1, wherein said yaw rate sensor is operable to sense positive and negative angular rotational velocity of the equipped vehicle about a local vertical axis of the equipped vehicle.

15. The vehicular control system of claim 1, wherein yaw rate data generated by said yaw rate sensor is provided to said control via a communication bus of the equipped vehicle.

16. The vehicular control system of claim 1, wherein said control, responsive to estimation by said processor of the actual yaw rate, provides yaw rate offset correction to correct the first yaw rate.

17. The vehicular control system of claim 1, wherein said control, when said processor is estimating the actual yaw rate, noise filters yaw rate data generated by said yaw rate sensor.

18. The vehicular control system of claim 1, wherein said yaw rate sensor comprises at least one selected from the group consisting of (i) a piezoelectric element, (ii) a micromechanical element and (iii) a microelectromechanical element.

19. A vehicular control system, said vehicular control system comprising:

a camera disposed at a vehicle equipped with said vehicular control system, wherein said camera is disposed at a windshield of the equipped vehicle and views through the windshield and forward of the equipped vehicle;
wherein said camera comprises a CMOS imaging array sensor;

a yaw rate sensor disposed at the equipped vehicle, said yaw rate sensor generating yaw rate data as the equipped vehicle travels along a road;

a steering sensor disposed at the equipped vehicle, said steering sensor generating steering data as the equipped vehicle travels along the road;

a control disposed at the equipped vehicle;

wherein said control comprises a processor that estimates an actual yaw rate of the equipped vehicle based on (i) a first yaw rate calculated at said control by processing yaw rate data generated by said yaw rate sensor and (ii) a second yaw rate calculated at said control by processing steering data generated by said steering sensor; and wherein said vehicular control system at least in part controls the equipped vehicle based on (i) image data captured by said camera as the equipped vehicle travels along the road and (ii) the estimated actual yaw rate of the equipped vehicle.

20. The vehicular control system of claim 19, wherein said vehicular control system comprises a collision avoidance system.

21. The vehicular control system of claim 19, wherein said vehicular control system comprises a collision mitigation system.

22. The vehicular control system of claim 19, wherein said vehicular control system comprises a lane keeping system.

23. The vehicular control system of claim 19, wherein said processor estimates the actual yaw rate of the equipped vehicle by averaging the first yaw rate and the second yaw rate.

24. The vehicular control system of claim 19, wherein said yaw rate sensor is operable to sense a left yaw rate of the equipped vehicle and a right yaw rate of the equipped vehicle.

25. The vehicular control system of claim 19, wherein said yaw rate sensor is operable to sense positive and negative angular rotational velocity of the equipped vehicle about a local vertical axis of the equipped vehicle.

26. The vehicular control system of claim 19, wherein said control, responsive to estimation by said processor of the actual yaw rate, provides yaw rate offset correction to correct the first yaw rate.

27. The vehicular control system of claim 19, wherein said control, when said processor is estimating the actual yaw rate, noise filters yaw rate data generated by said yaw rate sensor.

28. The vehicular control system of claim 19, wherein yaw rate data generated by said yaw rate sensor is provided to said control via a communication bus of the equipped vehicle.

29. The vehicular control system of claim 19, wherein steering data generated by said steering sensor is provided to said control via a communication bus of the equipped vehicle.

30. A vehicular control system, said vehicular control system comprising:

a camera disposed at a vehicle equipped with said vehicular control system, wherein said camera is disposed at a windshield of the equipped vehicle and views through the windshield and forward of the equipped vehicle;

wherein said camera comprises a CMOS imaging array sensor;

a yaw rate sensor disposed at the equipped vehicle, said yaw rate sensor generating yaw rate data as the equipped vehicle travels along a road;

an accelerometer disposed at the equipped vehicle, said accelerometer generating acceleration data as the equipped vehicle travels along the road;

a control disposed at the equipped vehicle;

wherein said control comprises a processor that estimates an actual yaw rate of the equipped vehicle based on (i) a first yaw rate calculated at said control by processing yaw rate data generated by said yaw rate sensor and (ii) a second yaw rate calculated at said control by processing acceleration data generated by said accelerometer; and wherein said vehicular control system at least in part controls the equipped vehicle based on (i) image data captured by said camera as the equipped vehicle travels along the road and (ii) the estimated actual yaw rate of the equipped vehicle.

31. The vehicular control system of claim 30, wherein said vehicular control system comprises a collision avoidance system.

32. The vehicular control system of claim 30, wherein said vehicular control system comprises a collision mitigation system.

33. The vehicular control system of claim 30, wherein said vehicular control system comprises a lane keeping system.

34. The vehicular control system of claim 30, wherein said processor estimates the actual yaw rate of the equipped vehicle by averaging the first yaw rate and the second yaw rate.

35. The vehicular control system of claim 30, wherein said accelerometer generates longitudinal acceleration data representative of longitudinal acceleration of the equipped vehicle.

36. The vehicular control system of claim 30, wherein said accelerometer generates lateral acceleration data representative of lateral acceleration of the equipped vehicle.

37. The vehicular control system of claim 30, wherein said yaw rate sensor is operable to sense a left yaw rate of the equipped vehicle and a right yaw rate of the equipped vehicle.

38. The vehicular control system of claim 30, wherein said yaw rate sensor is operable to sense positive and negative angular rotational velocity of the equipped vehicle about a local vertical axis of the equipped vehicle.

39. The vehicular control system of claim 30, wherein said control, responsive to estimation by said processor of the actual yaw rate, provides yaw rate offset correction to correct the first yaw rate.

40. The vehicular control system of claim 30, wherein said control, when said processor is estimating the actual yaw rate, noise filters yaw rate data generated by said yaw rate sensor.

41. The vehicular control system of claim 30, wherein yaw rate data generated by said yaw rate sensor is provided to said control via a communication bus of the equipped vehicle.

42. The vehicular control system of claim 30, wherein acceleration data generated by said accelerometer is provided to said control via a communication bus of the equipped vehicle.

* * * * *